May 17, 1927.
L. C. DREFAHL
1,628,829
PROCESS OF DISTILLING HYDROCHLORIC ACID
Filed April 5, 1923
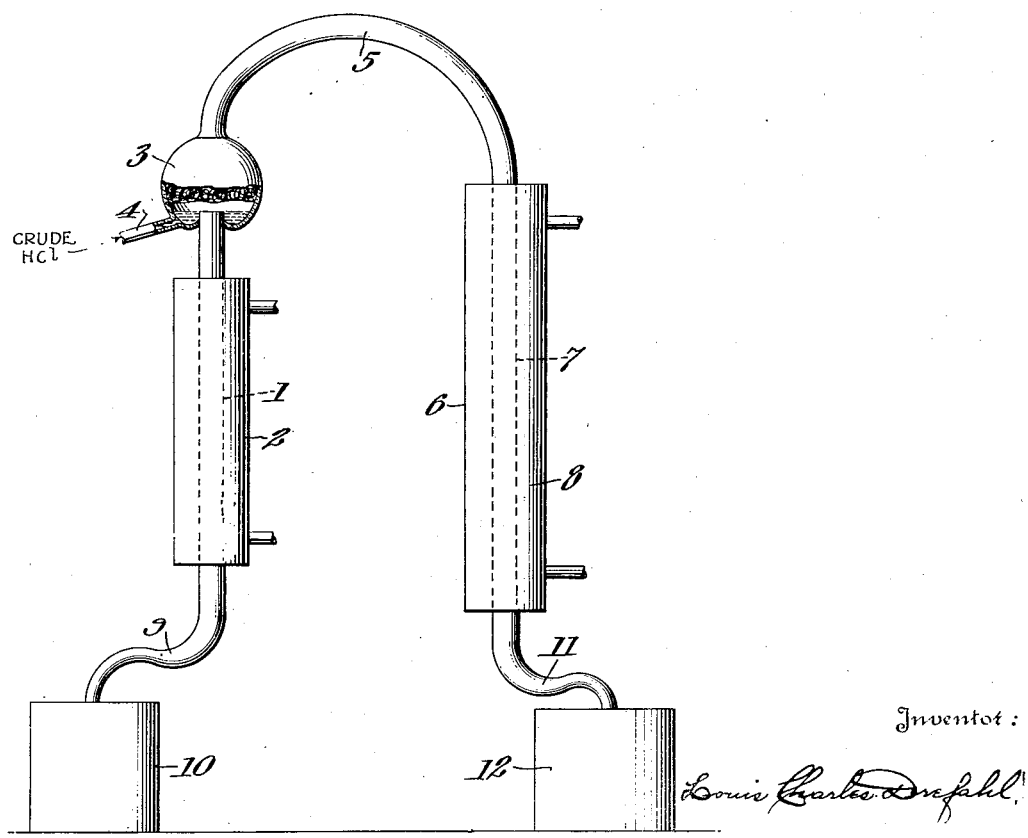

Patented May 17, 1927.

1,628,829

UNITED STATES PATENT OFFICE.

LOUIS CHARLES DREFAHL, OF LAKEWOOD, OHIO, ASSIGNOR TO THE GRASSELLI CHEMICAL COMPANY, OF CLEVELAND, OHIO, A CORPORATION OF OHIO.

PROCESS OF DISTILLING HYDROCHLORIC ACID.

Application filed April 5, 1923. Serial No. 630,144.

This invention relates to a method for the continuous distillation, concentration and purification of solutions of hydrochloric acid.

Heretofore in the manufacture of concentrated and more or less purified hydrochloric acid solutions from crude hydrochloric acid solutions it has been customary to distill the crude acid in glass retorts and to absorb the first distillate which consists of practically pure hydrochloric acid gas in a relatively pure dilute acid solution such as constant boiling acid solution obtained from a previous distillation, thus producing by two or more of such distillations and absorptions a concentrated acid product of up to say 39%. After the gaseous hydrochloric acid has been driven off constant boiling acid is distilled to the desired extent, leaving a residue containing the bulk of the impurities. This method is essentially a batch operation and involves the use of a large number of small, expensive and fragile glass retorts, condenser tubes, conduits, etc. and a relatively large expenditure for upkeep and replacement and for labor as compared with the quantity of acid produced. It has been regarded as impossible heretofore to simultaneously distill and condense hydrochloric acid gas and constant boiling acid in such proportion as to produce in a single operation a highly concentrated chemically pure hydrochloric acid solution.

In accordance with my invention chemically pure concentrated hydrochloric acid solutions up to say 39 percent strength can be continuously produced in a single continuous distilling operation.

The general procedure for the distillation, concentration and purification of hydrochloric acid involves continuously supplying a crude concentrated hydrochloric acid solution to the heating zone of a distilling vessel, continuously withdrawing residual acid containing the impurities and the excess of water and continuously condensing the hydrochloric acid distillate. The strength of acid produced will of course depend upon the relative rate of the supply of crude acid and the rate of distillation, these factors being varied as required to produce a more or less concentrated acid product.

The process can be carried out in different forms of apparatus, one of which is illustrated in the accompanying drawing in which—

The figure is a vertical elevation with parts broken away of what may be called a vertical tube distillation apparatus.

Referring to the drawing, 1 is a relatively long, narrow tube made of glass, silica or other suitable material capable of withstanding the action of heat and the liquid to be distilled. 2 is a heating jacket having the usual inlet and outlet for the heating fluid such as, for instance, steam, combustion gases, hot air or oil. The upper end of the tube 1 extends into and a short distance above the lower wall of the chamber 3, the upper portion of which is packed with glass wool or other suitable gas filtering material, while the lower portion forms a receptacle for the liquid to be distilled which is supplied through the supply pipe 4. The top of the chamber 3 communicates through the pipe 5 with the condenser 6 comprising the condensing tube 7 and the cooling jacket 8. 9 is a trapped conduit leading from the lower end of the distilling tube 1 to the distillation residue receiver 10, and 11 is a similar trapped conduit connecting the lower end of the condenser tube 7 with the distillate receiver 12.

The process is carried out in the apparatus illustrated as follows:

Crude acid is supplied to the chamber 3 through the supply pipe 4 and overflows the edge of the tube 1 flowing down the inner walls thereof in a thin layer or film. Within the heating jacket 2 the acid is heated to distillation temperature, the distillate passing upwardly through the tube counter-current to the flow of liquid acid and passes through the filter of glass wool whereby entrained droplets or vapor of crude acid and probably also condensed droplets or vapor of distilled acid are caught and eventually drop back into the crude acid supply. The filtered gaseous distillate passes forward through the pipe 5 and the condenser 6 and the condensate flows through the pipe 11 to the receiver 12. The undistilled acid residue flows on down through the tube 1 and passes by way of the pipe 9 to the slop or residual acid receiver 10. The supply of acid and the rate of distillation or the rate of heating are regulated to produce the desired strength of acid.

The distillate may be regarded as containing all of the hydrochloric acid present in the crude solution in excess of the amount required to form constant boiling acid with sufficient constant boiling acid to give the desired concentration of acid solution, while the slop or residual acid is substantially a constant boiling acid containing practically all of the impurities present in the crude acid solution. The residual acid may be treated in any suitable manner for the recovery of its hydrochloric acid content.

Thus it will be seen that instead of absorbing the first distillate of hydrochloric acid gas in constant boiling acid from a previous distillation to produce a concentrated acid product and then distilling and separately collecting constant boiling acid and discarding the residual acid with the impurities as in processes heretofore employed, my process accomplishes a continuous direct distillation and condensation of acid of the desired concentration, the absorbing operation and the separate collection of hydrochloric acid gas and constant boiling acid being eliminated.

I claim:

Process of distilling hydrochloric acid solutions which comprises flowing a crude solution of hydrochloric acid of greater concentration than constant boiling acid continuously in one direction in the form of a thin layer onto, over and off of a heating surface and withdrawing and condensing the vapors generated while regulating the rate of flow relative to the rate of vaporization to produce a condensate of greater concentration than constant boiling acid.

In testimony whereof, I affix my signature.

LOUIS CHARLES DREFAHL.